(12) United States Patent
Gulati et al.

(10) Patent No.: US 9,918,244 B2
(45) Date of Patent: Mar. 13, 2018

(54) USER EQUIPMENT TESTING TECHNIQUES FOR DEVICE-TO-DEVICE TRANSMISSION CHANNELS

(71) Applicant: QUALCOMM Incorporated, San Diego, CA (US)

(72) Inventors: Kapil Gulati, Franklin Park, NJ (US); Sudhir Kumar Baghel, Bridgewater, NJ (US); Saurabha Rangrao Tavildar, Jersey City, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/042,348

(22) Filed: Feb. 12, 2016

(65) Prior Publication Data

US 2016/0262034 A1    Sep. 8, 2016

Related U.S. Application Data

(60) Provisional application No. 62/129,603, filed on Mar. 6, 2015.

(51) Int. Cl.
*H04W 24/08* (2009.01)
*H04W 4/00* (2018.01)
*H04B 17/29* (2015.01)

(52) U.S. Cl.
CPC ............ *H04W 24/08* (2013.01); *H04B 17/29* (2015.01); *H04W 4/005* (2013.01)

(58) Field of Classification Search
CPC ...... H04W 24/08; H04W 40/02; H04W 24/02
See application file for complete search history.

(56) References Cited

U.S. PATENT DOCUMENTS

2015/0014800 A1* 1/2015 Satoh ..................... H01L 43/02
257/421

FOREIGN PATENT DOCUMENTS

WO    WO-2007099075 A1    9/2007

OTHER PUBLICATIONS

3GPP TSG-RAN WG4 Meeting #74 Athens, Greece, Feb. 9-13, 2015, Agenda Item: 6.6.4, Intel Corporation Discussion on D2D demodulation performance requirements.*
3GPP TSG-RAN WG$ Meeting #74 Athens, Greece, Feb. 9-13, 2015 Agenda Item: 6.6.4 Title: Intel Corporation Discussion on D2D demodulation performance requirements.*

(Continued)

*Primary Examiner* — Myron K Wyche
(74) *Attorney, Agent, or Firm* — Holland & Hart LLP

(57) ABSTRACT

Improved methods, systems, or apparatuses for UE equipment testing for D2D enabled UEs may include determining performance metrics based on one or more of received transport blocks (TBs) or received service data units (SDUs) from the received one or more data channels on a per channel basis, and reporting the determined performance metric(s) on a per channel basis. In some examples, the performance metrics may include a count of a number of TBs or SDUs successfully received at a channel.

30 Claims, 10 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA) and Evolved Packet Core (EPC); Special Conformance Testing Functions for User Equipment (UE) (Release 10)," 3GPP TS 36.509 v10.3.0 (Sep. 2014), Technical Specification, Sep. 2014, 42 pgs., XP_50925487A, 3rd Generation Partnership Project, Valbonne, FR.
Huawei, "Discussion on D2D Demodulation Requirements," 3GPP TSG-RAN WG4 Meeting #74, R4-150098, Athens, Greece, Feb. 9-13, 2015, 7 pgs., XP_50937600A, 3rd Generation Partnership Project.
Intel Corporation, "Discussion on D2D Demodulation Performance Requirements," 3GPP TSG-RAN WG4 Meeting #74, R4-150156, Athens, Greece, Feb. 9-13, 2015, 8 pgs., XP_50937652A, 3rd Generation Partnership Project.
ISA/EPO, International Search Report and Written Opinion of the International Searching Authority, Int'l App. No. PCT/US2016/017949, dated Apr. 26, 2016, European Patent Office, Rijswijk, NL, 13 pgs.

* cited by examiner

USER EQUIPMENT TESTING TECHNIQUES FOR DEVICE-TO-DEVICE TRANSMISSION CHANNELS

CROSS REFERENCES

The present Application for Patent claims priority to U.S. Provisional Patent Application No. 62/129,603 by Gulati et al., entitled "User Equipment Testing Techniques For Device-To-Device Transmission Channels," filed Mar. 6, 2015, assigned to the assignee hereof, and expressly incorporated by reference herein.

BACKGROUND

Field of the Disclosure

The present disclosure, for example, relates to wireless communication systems, and more particularly to equipment testing techniques for Device-to-Device (D2D) transmission channels.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Generally, a wireless multiple-access communications system may include a number of base stations, each simultaneously supporting communication for multiple user devices. Base stations may communicate with devices on downstream and upstream links. Each base station has a coverage range, which may be referred to as the coverage area of the base station or cell.

Devices (i.e., user equipment (UEs)) that are proximate to each other may also communicate directly via device-to-device (D2D) or proximity based service (ProSe) communication. According to ProSe specifications, there is no feedback (e.g., Hybrid Automatic Repeat Request (HARD) acknowledgment/negative-acknowledgment (ACK/NACK) feedback) corresponding to the reception of ProSe channels at a UE. Thus, for the purpose of UE conformance testing, an additional procedure is required to measure the UE receiver performance for ProSe channels and confirm proper function of the UE receiver performance.

SUMMARY

The described features generally relate to one or more improved methods, systems, or apparatuses for UE equipment testing for D2D enabled UEs. The improved methods include determining performance metrics based on one or more of received transport blocks (TBs) or received service data units (SDUs) from the received one or more data channels on a per channel basis, and reporting the determined performance metric(s) on a per channel basis. In some examples, the performance metrics may include a count of a number of TBs or SDUs successfully received at a channel.

A method of wireless communication at a wireless device is described. The method may include receiving a test activation message indicating that reception of one or more data channels at the UE are to be tested, initiating a test mode responsive to receiving the test activation message, receiving the one or more data channels, determining one or more performance metrics based on one or more of received transport blocks (TBs) or received service data units (SDUs) from the received one or more data channels on a per channel basis, and reporting one or more of the determined performance metrics on a per channel basis.

An apparatus for wireless communication at a wireless device is described. The apparatus may include means for receiving a test activation message indicating that reception of one or more data channels at the UE are to be tested, means for initiating a test mode responsive to receiving the test activation message, means for receiving the one or more data channels, means for determining one or more performance metrics based on one or more of received transport blocks (TBs) or received service data units (SDUs) from the received one or more data channels on a per channel basis, and means for reporting one or more of the determined performance metrics on a per channel basis.

A further apparatus for wireless communication at a wireless device is described. The apparatus may include a processor, memory in electronic communication with the processor, and instructions stored in the memory, wherein the instructions are executable by the processor to receive a test activation message indicating that reception of one or more data channels at the UE are to be tested, initiate a test mode responsive to receiving the test activation message, receive the one or more data channels, determine one or more performance metrics based on one or more of received transport blocks (TBs) or received service data units (SDUs) from the received one or more data channels on a per channel basis, and report one or more of the determined performance metrics on a per channel basis.

A non-transitory computer-readable medium storing code for wireless communication at a wireless device is described. The code may include instructions executable to receive a test activation message indicating that reception of one or more data channels at the UE are to be tested, initiate a test mode responsive to receiving the test activation message, receive the one or more data channels, determine one or more performance metrics based on one or more of received transport blocks (TBs) or received service data units (SDUs) from the received one or more data channels on a per channel basis, and report one or more of the determined performance metrics on a per channel basis.

In some examples of the method, apparatuses, or non-transitory computer-readable medium described above, the received SDUs comprise one or more of medium access control (MAC) SDUs, radio link control (RLC) SDUs, or packet data convergence protocol (PDCP) SDUs. Additionally or alternatively, in some examples the test activation message is a device-to-device (D2D) test activation message to initiate the test mode for one or more D2D channels.

In some examples of the method, apparatuses, or non-transitory computer-readable medium described above, the one or more D2D channels comprise one or more of a Physical Sidelink Discovery Channel (PSDCH), a Physical Sidelink Shared Channel (PSSCH), a Physical Sidelink Control Channel (PSCCH), or a Physical Sidelink Broadcast Channel (PSBCH). Additionally or alternatively, in some examples the one or more data channels comprise at least a first data channel associated with discovery of D2D devices and at least a second data channel associated with communications with D2D devices.

In some examples of the method, apparatuses, or non-transitory computer-readable medium described above, the test activation message is received from a test system coupled with the UE. Additionally or alternatively, in some examples initiating the test mode comprises initiating one or more counters each associated with one or more of the data channels, the one or more counters to maintain a count of successfully received transport blocks or SDUs on the associated one or more data channels.

In some examples of the method, apparatuses, or non-transitory computer-readable medium described above, the one or more counters comprise a plurality of separate counters for each of two or more data channels. Additionally or alternatively, in some examples the one or more counters comprise a first plurality of counters associated with a first data channel, the first plurality of counters indexed by a process identification, and at least a second counter associated with one or more other data channel.

In some examples of the method, apparatuses, or non-transitory computer-readable medium described above, a number of the first plurality counters corresponds to a maximum number of simultaneous discovery processes supported by the UE. Additionally or alternatively, in some examples the first plurality counters are indexed by a code associated with each simultaneous discovery process.

In some examples of the method, apparatuses, or non-transitory computer-readable medium described above, a number of the first plurality counters corresponds to a maximum number of simultaneous Physical Sidelink Control Channel (PSCCH) processes supported by the UE. Additionally or alternatively, in some examples the first plurality counters are indexed by an identification of a logical group of D2D devices.

In some examples of the method, apparatuses, or non-transitory computer-readable medium described above, a number of the first plurality counters corresponds to a maximum number of simultaneous Physical Sidelink Shared Channel (PSSCH) processes supported by the UE. Additionally or alternatively, in some examples the first plurality counters are indexed by one or more of a source identification of a PSSCH source, a destination identification of a PSSCH destination, or a logical channel identification (LCD).

In some examples of the method, apparatuses, or non-transitory computer-readable medium described above, the second counter is associated with a Physical Sidelink Broadcast Channel (PSBCH). Additionally or alternatively, in some examples the determining one or more performance metrics comprises incrementing a counter of the one or more counters associated with each respective data channel for each successfully received transport block or SDU on the associated data channel.

In some examples of the method, apparatuses, or non-transitory computer-readable medium described above, reporting one or more of the performance metrics comprises receiving a request to report counter information for a requested counter of the one or more counters, and transmitting a report of counter information responsive to receiving the request to report. Additionally or alternatively, in some examples the report of the counter information comprises information for each of a first plurality of counters associated with the requested counter and a mapping between counters of the first plurality of counters and a process identification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
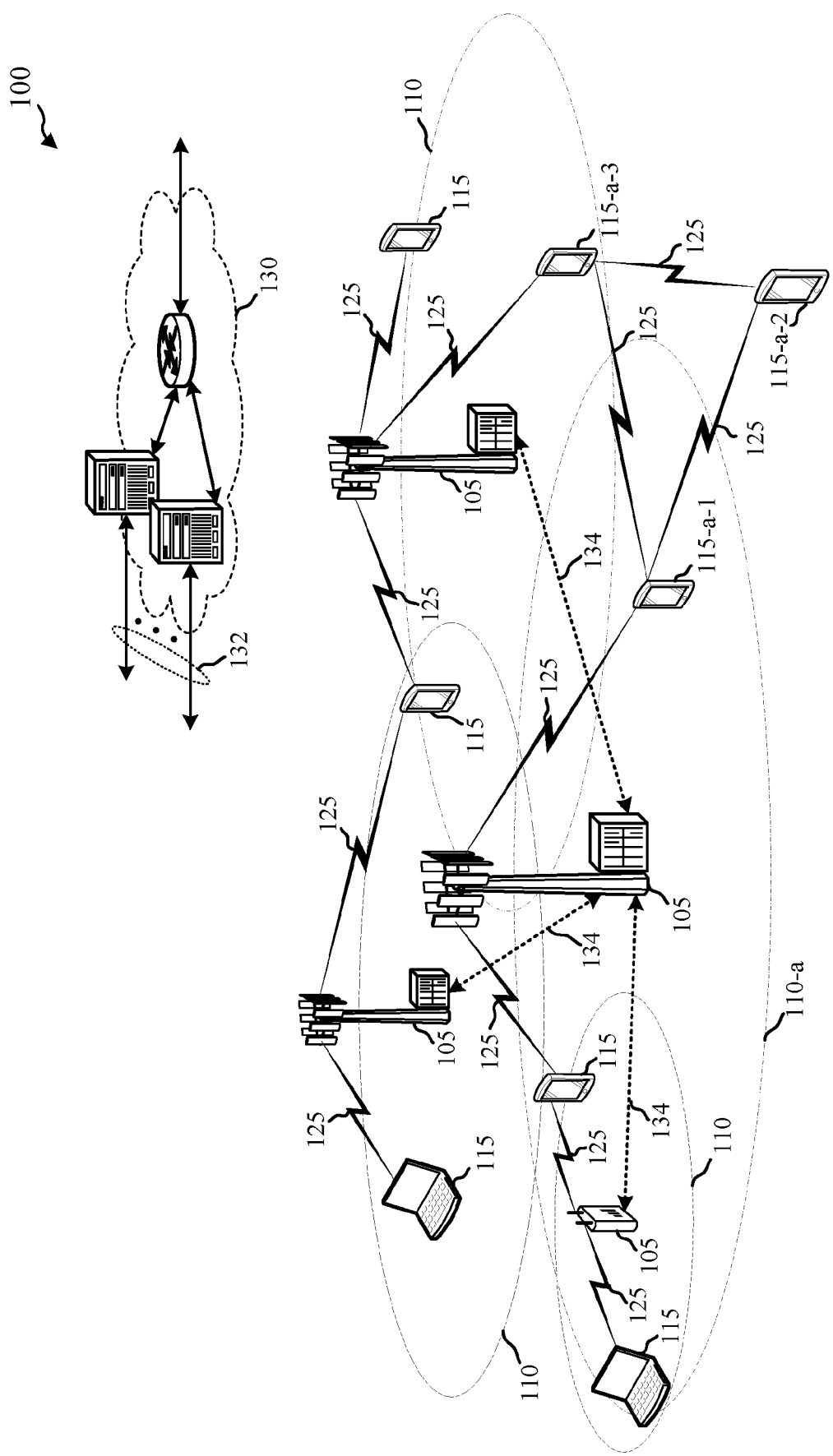
FIG. 1 is a block diagram of an example of a wireless communications system in accordance with various aspects of the present disclosure.

Typically, devices (e.g., user equipment (UEs)) engage in wireless communication by communicating with a base station of a wireless communications system. However, these devices may also participate in direct D2D or ProSe wireless communications. D2D discovery allows UEs that are within range of each other to communicate directly with each other instead of communicating through a base station. An example of when D2D wireless communication is desirable is when a UE intends to have a communication session with other UEs in close proximity, or just be visible to other UEs in the same location. The UE may broadcast a D2D discovery announcement, such as a Direct Peer-Discovery Signal in a Long Term Evolution (LTE) system, which may then be received by a UE in the proximity that is monitoring such discovery communications. The announcing UE may include a code such as a D2D discovery application code in the over-the-air (OTA) discovery announcement message. The D2D discovery application code may indicate the desired intent or function of the announcing UE. A monitoring UE may receive the D2D discovery announcement with its D2D discovery application code, and can then determine whether the monitoring UE is available to engage in D2D communications with the announcing UE. Discovery-related communications are transmitted using a Physical Sidelink Discovery Channel (PSDCH).

Other direct D2D or ProSe wireless communications may include communications channels through which D2D devices may directly communicate through transmissions of data. Direct communications may be transmitted using a Physical Sidelink Shared Channel (PSSCH) or a Physical Sidelink Control Channel (PSCCH). Furthermore, synchronization may be performed through transmissions on a Physical Sidelink Broadcast Channel (PSBCH).

For ProSe direct discovery, a maximum number of simultaneous ProSe direct discovery processes supported may be indicated by the UE as a UE capability (e.g., through reporting a discSupportedProc value) with the value of either 50 or 400. For ProSe direct communication, the maximum number of simultaneous ProSe direct communications processes supported is 16, according to some deployments. As mentioned above, communications using the noted D2D communications channels, according to existing specifications, do not use any feedback mechanism (e.g., HARQ ACK/NACK feedback) to verify communications are properly received. Accordingly, standards (e.g., 3GPP TS 36.509) may specify that UE test loop functions be implemented to provide access to isolated functions of the UE via the radio interface without introducing new physical interfaces, for the purpose of conformance testing to verify proper operation of the UE receiver. Various aspects of the present disclosure provide techniques for testing of D2D communications channels that provide for efficient and cost-effective conformance testing of D2D communications channels.

According to aspects of the present disclosure, a UE may enter a test mode and determine performance metrics based on received transport blocks (TBs), received service data units (SDUs), or both, for one or more D2D communications channels that may be received from test equipment. These performance metrics may be reported on a per channel basis and the test equipment may verify proper operation of the UE with respect to D2D communications. In some examples, the performance metrics may include a count of a number of TBs or SDUs successfully received at a channel. In certain examples, one or more counters may be associated with each D2D communication channel, and in further examples certain D2D channels (e.g., PSDCH, PSCCH, or PSSCH) may each have a plurality of counters that may be associated with separate processes associated with each channel. For example, for a PSDCH channel, a UE may provide a separate counter for each of the maximum number of simultaneous ProSe direct discovery processes supported by the UE, and the counters may be indexed by a process identification for each process. Similar sets of counters may be provided for other channels, such as PSCCH or PSSCH, that may support multiple separate processes.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and UEs 115, respectively. The system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro eNB, for example. A base station for a pico cell may be referred to as a pico eNB. And, a base station for a femto cell may be referred to as a femto eNB or a home eNB. A base station may support one or multiple (e.g., two, three, four, and the like) cells.

The core network 130 may communicate with the base stations 105 via backhaul links 132 (e.g., S1, etc.). The base stations 105 may also communicate with one another, e.g., directly or indirectly via backhaul links 134 (e.g., X2, etc.) or via backhaul links 132 (e.g., through core network 130).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Base stations 105 may also communicate information and commands to UEs 115. For example, when a UE 115 enters into a connected mode with a base station 105, the base station 105 and UE 115 mutually authenticate each other. Once authenticated, the base station 105 may securely communicate information to the UE 115. Among the information that may be communicated from a base station 105 to a UE 115 is information pertaining to the current time or some other timing variable so that the UE 115 can be fully synchronized with the base station 105 (and other devices in the wireless communications system 100). The current time or other timing variable may be used by the UE 115 during authentication of a D2D discovery message, as further explained in the embodiments below.

The UEs 115 are dispersed throughout the wireless communications system 100, and each UE may be stationary or mobile. A UE 115 may also be referred to by those skilled in the art as a user device, a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. A UE 115-a may also communicate directly with another UE 115 via D2D wireless communications. In one example, a UE 115-a-1 within a coverage area 110-a of a base station 105 may serve as a relay for UE 115-a-2 that is outside the coverage area 110-a of the base station 105. The in-coverage UE 115-a-1 may relay (or retransmit) communications from the base station 105 to the out-of-coverage UE 115-a-2. Similarly, the in-coverage UE 115-a-1 may relay communications from the out-of-coverage UE 115-a-2 to the base station 105. Additionally, D2D wireless communication may occur between UEs 115 that are each in-coverage and may occur for many different reasons. Thus, in-coverage UE 115-a-1 may engage in D2D wireless communication with in-coverage UE 115-a-3. UE 115-a-3 may also engage in D2D wireless communication with UE 115-a-2. As mentioned above, data may be transmitted between D2D capable UEs 115-a-1 through 115-a-3 through PSSCH and PSCCH transmissions, and synchronization of D2D capable UEs 115-a-1 through 115-a-3 may be established through PSBCH communications.

In order for a UE 115 to participate in D2D wireless communication, the UE 115 may first participate in D2D discovery. D2D discovery allows UEs 115 to discover other UEs enabled to participate in D2D communication. D2D discovery includes an announcing UE that broadcasts a D2D discovery announcement, and a monitoring UE that monitors for D2D discovery announcements. A monitoring UE may receive a D2D discovery announcement and may then respond and engage in D2D wireless communications with the announcing UE. As discussed discovery of D2D capable UEs 115 may be conducted through PSDCH communications.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. The communication links 125 may also include D2D messages (including D2D discovery messages) exchanged between UEs 115.

Figure 2:
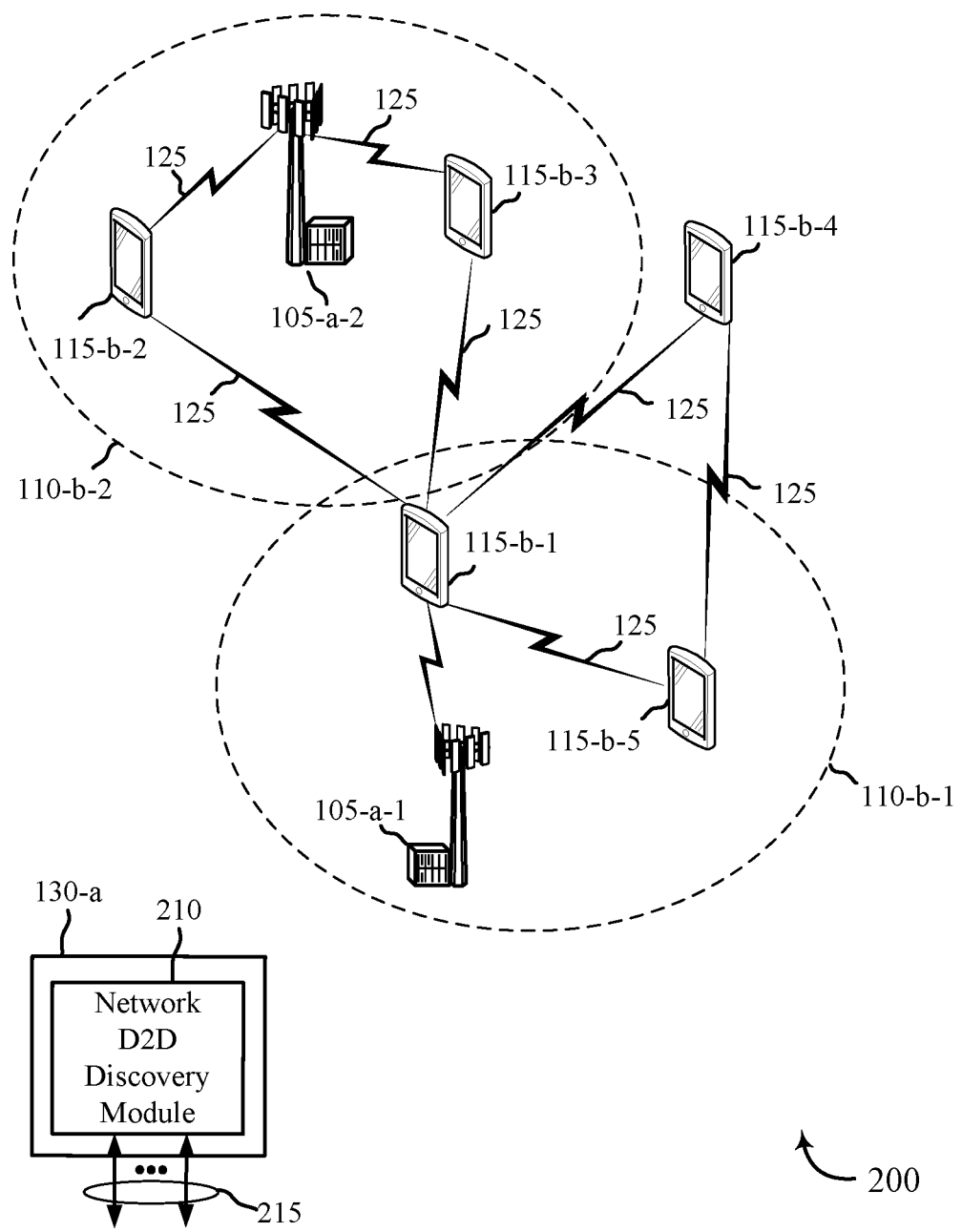
FIG. 2 is a block diagram of an example of a system for D2D discovery and communication in accordance with various aspects of the present disclosure.

FIG. 2 is a block diagram of an example of a wireless communications system 200 which may include D2D capable devices. The system 200 of FIG. 2 may be an example of the wireless communications system 100 described with respect to FIG. 1. In one configuration, a base station 105-a-1 may communicate with one or more devices that fall within a coverage area 110-b-1 of the base station 105-a-1. An in-coverage UE 115-b-1 may receive/transmit communications from/to the base station 105-a-1. One or more UEs 115-b-2, 115-b-3, 115-b-4 may be outside of the coverage area 110-b-1 of the base station 105-a-1 and may participate in D2D communications. Other UEs 115-b-5 may be within the coverage area 110-b-1 of the base station 105-a-1, but may also still participate in D2D communications. UEs 115-b-2, 115-b-3 may also be within the coverage area 110-b-2 of a different base station 105-a-2 and may be in communication with base station 105-a-2. The base stations 105-a and the UEs 115-b may be examples of the base stations 105 and UEs 115 described with reference to FIG. 1.

In one embodiment, the in-coverage UE 115-b-1 may broadcast, multi-cast, or unicast a D2D discovery signal via communication link 125. The signal may be sent to one or more UEs that are either in- or out-of-coverage. The D2D discovery signal may be a D2D discovery announcement message. The D2D discovery announcement message may indicate, for example, an identifier of the in-coverage UE 115-b-1. For example, the identifier may be a medium access control (MAC) address of the in-coverage UE 115-b-1. In addition, the D2D discovery signal may include a D2D discovery application code of the UE 115-b-1.

In one configuration, an out-of-coverage UE may transmit a D2D discovery signal to one or more in-coverage UEs 115-b-1. The peer discovery signal may indicate that the out-of-coverage UE is out-of-coverage or requesting relay services. The signal may include an identifier of the out-of-coverage UE. In one configuration, a UE may broadcast a D2D discovery signal when it senses that it is about to be out of the coverage area 110-b-1 of the base station 105-a-1. In another embodiment, a UE may broadcast the signal after it is already out of the coverage area 110-b-1.

As an additional example, two in-coverage UEs 115-b-1, 115-b-5 may also communicate with each other via a direct D2D connection. In this example, UE 115-b-5 may transmit a signal requesting a direct D2D connection with other UEs proximate to UE 115-b-5. UE 115-b-1 may receive the request and then initiate direct D2D communications with UE 115-b-5. In an additional example, UEs 115-b-2, 115-b-3, may each communicate with UE 115-b-1 via direct D2D connections. For example, the UE 115-b-1 may act as a relay to the UEs 115-b-2, 115-b-3.

Before a UE 115 may participate in D2D wireless communication, the UE 115 may first be authorized. Authorization is granted by the core network 130-a. Specifically, the core network 130-*a* may include a network D2D discovery module 210 that is enabled to authorize D2D communication. An example of a network D2D discovery module 210 is a ProSe Function. A UE 115 may request authorization for D2D communication by communicating with the network D2D discovery module 210 via a wireless interface 215 such as a PC3 interface. The network D2D discovery module 210 may respond by authorizing the requesting UE 115. As discussed above, direct D2D communications may be transmitted using a Physical Sidelink Shared Channel (PSSCH) or a Physical Sidelink Control Channel (PSCCH), and synchronization may be performed through transmissions on a Physical Sidelink Broadcast Channel (PSBCH). The number of simultaneous D2D connections may vary depending upon UE 115 capability, and in some examples UEs 115 may limit a maximum number of simultaneous PSSCH or PSCCH processes supported by UEs 115 to a predetermined maximum number (e.g., 16).

For ProSe direct discovery via the PSDCH, a maximum number of simultaneous direct discovery processes supported by a UE 115 also may be a predetermined number, and may be indicated by a UE 115 (e.g., through reporting a discSupportedProc value) with, in some examples, the value of either 50 or 400. As mentioned above, communications using the various described D2D communications channels, according to existing specifications, do not use any feedback mechanism (e.g., HARQ ACK/NACK feedback) to verify communications are properly received. Accordingly, standards (e.g., 3GPP TS 36.509) may specify that UE test loop functions be implemented to provide access to isolated functions of the UE via the radio interface without introducing new physical interfaces, for the purpose of conformance testing to verify proper operation of the UE receiver. Various aspects of the present disclosure provide techniques for testing of D2D communications channels that provide for efficient and cost-effective conformance testing of D2D communications channels.

Figure 3:
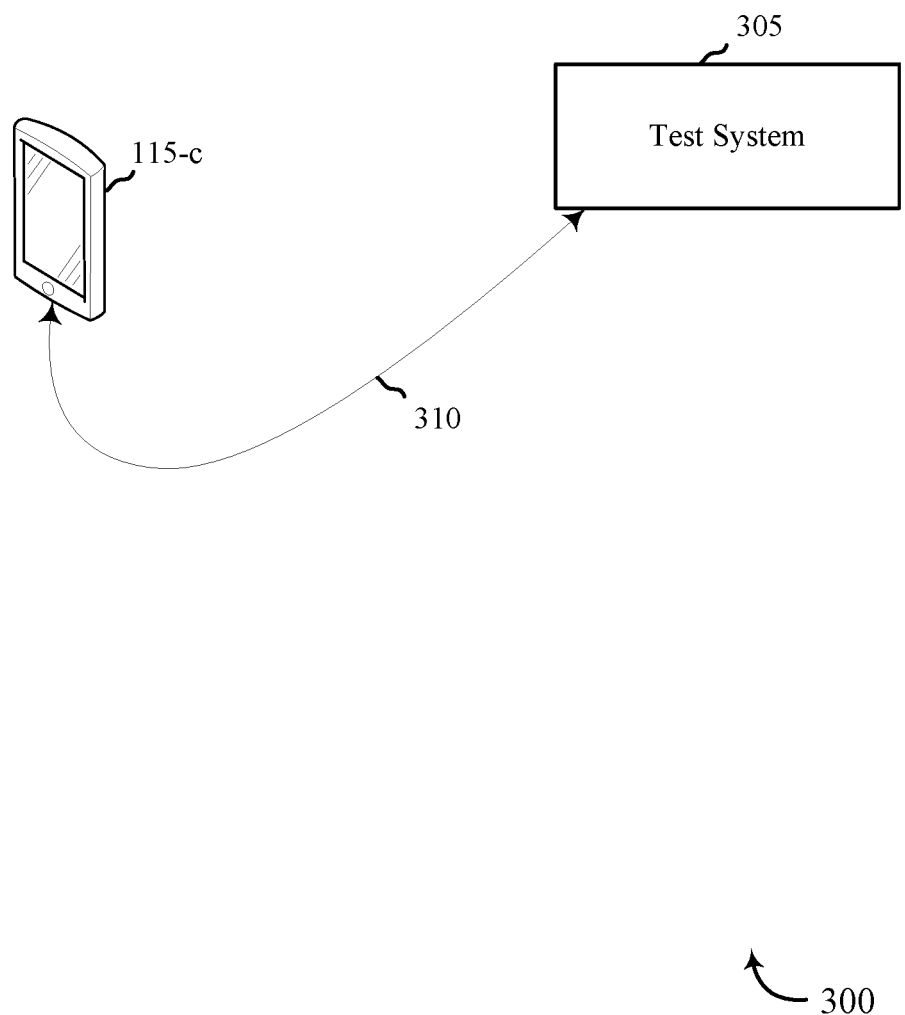
FIG. 3 is a block diagram of a UE and a test system in accordance with various aspects of the present disclosure.

With reference now to FIG. 3, a block diagram of an example of a test network 300 is described in which a D2D capable UE 115-*c* may be tested to verify the UE 115-*c* receivers properly receive and process different D2D communications channels. The test network 300 of FIG. 3 may be implemented to test UE 115-*c* and verify proper operation in a wireless communication system, such as wireless communications systems 100 or 200 described with respect to FIG. 1 or 2. UE 115-*c* may be an example of a UE 115 of FIG. 1 or 2. In this example, UE 115-*c* may be tested using test system 305 and a physical cable 310 to simulate operation for various D2D communications scenarios. As mentioned above, because many D2D channels do not provide feedback to acknowledge successful receipt of communications, testing of conformance of the UE 115-*c* may be specified by established standards associated with a wireless communications system. In this example, test system 305 may emulate various use scenarios for the UE 115-*c* via physical cable 310, and the UE 115-*c* may receive a data stream, process the data stream, and report back to the test system 305 results of the processing. If there are any errors or unexpected results, the test system 305 may determine that the UE 115-*c* has failed testing. Likewise, if there are no errors and the UE 115-*c* reports back expected results, the test system 305 may determine that the UE 115-*c* has passed testing related to these D2D communications.

Figure 4:
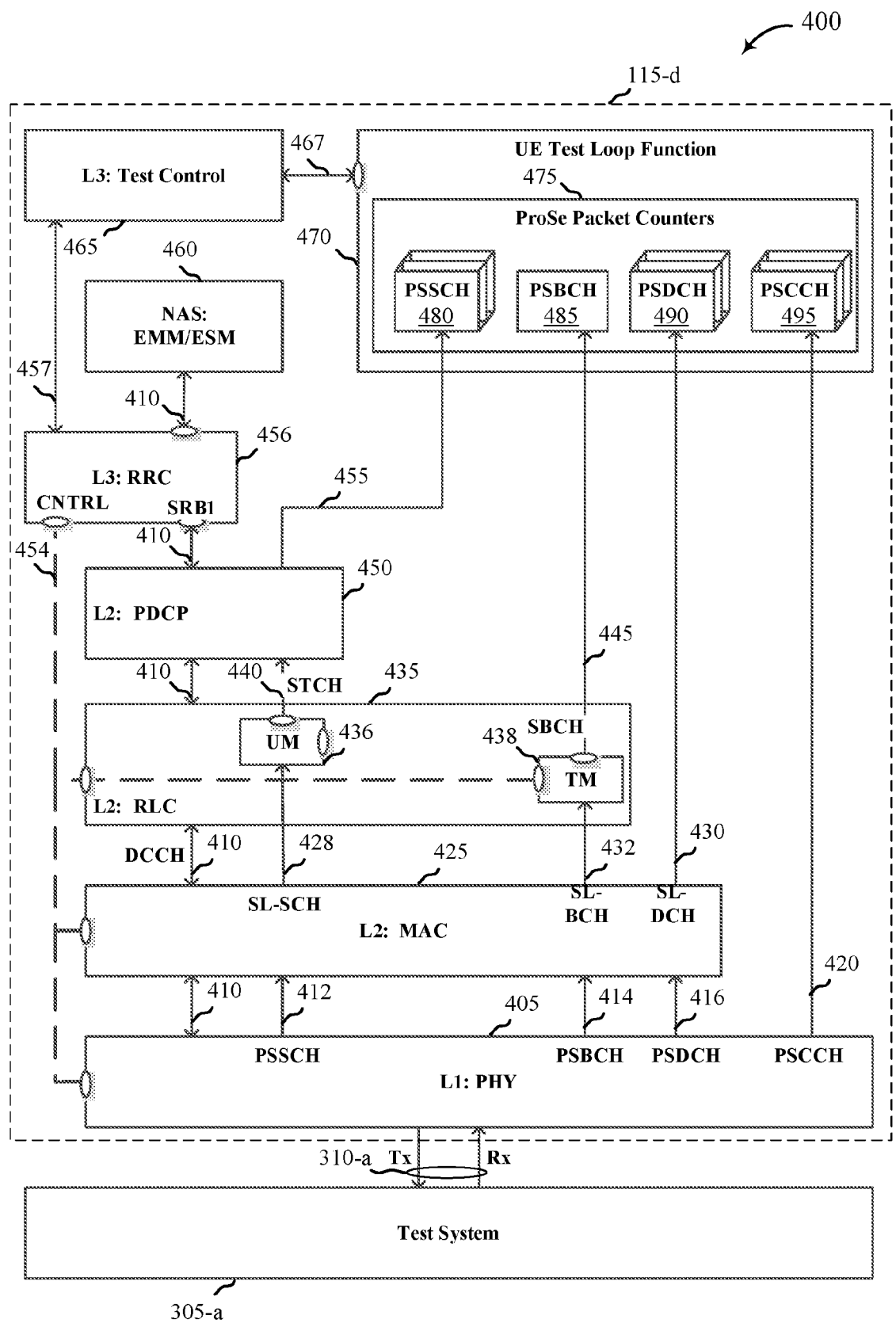
FIG. 4 is a more detailed block diagram of a UE and test system in accordance with various aspects of the present disclosure.

FIG. 4 illustrates a block diagram of another test network 400 in accordance with various aspects of the disclosure. In this example, a D2D capable UE 115-*d* may be tested to verify the UE 115-*d* processing layers properly receive and process different D2D communications channels. The test network 400 of FIG. 4 may be implemented to test UE 115-*d* and verify proper operation in a wireless communication system, such as wireless communications systems 100 or 200 described with respect to FIG. 1 or 2. UE 115-*c* may be an example of a UE 115 of FIG. 1 or 2. The test network 400 of FIG. 4 may be an example of the test network 300 of FIG. 3. In this example, UE 115-*d* may be tested using test system 305-*a*, which may be an example of test system 305 of FIG. 3, and a physical cable 310-*a* (which may be an example of physical cable 310 of FIG. 3) to simulate operation for various D2D communications scenarios. While a physical cable 310-*a* is illustrated and described for such test functions, it will be readily understood that communications between test system 305-*a* and UE 115-*d* may be through wireless communications (e.g., through cellular communications, near-field communications, or any other suitable wireless communication).

The UE 115-*d* may include a number of physical and logical layers, as are known in the art, including a L1 physical layer 405, a L2 medium access control (MAC) layer 425, a L2 radio link control (RLC) 435, a L2 packet data convergence protocol (PDCP) layer 450, a L3 radio resource control (RRC) layer 456, a non-access stratum (NAS): EPS mobility management (EMM)/EPS session management (ESM) layer 460, and a L3 test control layer 465. The UE 115-*d* of this example may also include a UE test loop function 470, which may include a number of ProSe packet counters 475. The L1 physical layer 405 may receive communications from test system 305-*a* via cable 301-*a*, and may provide physical processing of received signals and output control signals 454, a dedicated control channel (DCCH) 410, a PSSCH 412, a PSBCH 414, a PSDCH 416, and a PSCCH 420. The DCCH 410, PSSCH 412, PSBCH 414, and PSDCH 416 may be provided to the L2 MAC layer 425, which may output DCCH 426, SL-SCH 428, SL-BCH 432, and SL-DCH 430. The L2 RLC layer 435 may include a unacknowledged mode (UM) function 436 that may output STCH 440 and a transparent mode (TM) function 438 that may output a SBCH 445. The L2 RLC layer may also output DCCH 442. DCCH 410 and STCH 440 may be provided to L2 PDCP layer 452, which may output PDCP SDUs 455 for the PSSCH 412, and may provide DCCH 410 to the L3 RRC layer 456. The L3 RRC layer 456 may provide DCCH 410 to the NAS:EMM/ESM 460, and may also output a control signal 457 to the L3 test control function 465. The L3 test control 465 may provide control signals 467 to the UE test loop function 470. As mentioned above, the UE test loop function 470 may include ProSe packet counters 475, which include a PSSCH packet counter 480, a PSBCH packet counter 485, a PSDCH packet counter 490, and a PSCCH packet counter 495.

In some examples, the test system 305 may include a system simulator that may initiate, through the test control layer 465, a closed UE test loop mode procedure to start a UE test loop function in the UE 115-*d* while in E-UTRA mode. In various examples, the UE 115-*d* may support two test loop modes, one for discovery (e.g., PSDCH communications) and another for direct communications (e.g., PSCCH, PSSCH, PSBCH communications). On reception of a close UE test loop message at test control layer 465, if the test loop modes corresponding to ProSe direct discovery or ProSe direct communications are selected, then the UE 115-*d* may initialize the corresponding ProSe packet counters 475 to zero, and increment each counter based on data received for the channel associated with each counter. For example, PSDCH packet counter 490 may receive MAC service data units (SDUs) through the SL-DCH 430 from the L2 MAC layer 425. In some examples, the PSDCH packet counter 490 may include a single packet counter that is incremented for each PSDCH packet received through the L2 MAC layer 425. In other examples, the PSDCH packet counter 490 may include a plurality of packet counters that are indexed to correspond to one or more simultaneous discovery processes supported by the UE. For example, the number of counters can be same as the maximum number of simultaneous discovery processes supported by the UE 115-d (e.g., 50 or 400, depending upon UE capability).

In some examples, the PSSCH packet counter 480 may similarly be a single packet counter, or may include a plurality of packet of counters that can correspond to a number of simultaneous PSSCH processes supported by the UE 115-d. In some examples, the plurality of PSSCH counters may be indexed to identify particular PSSCH processes, such as being indexed by some or all of the following triplet: 24 bits of L2 Source ID, 24 bits of L2 destination ID, 5 bit of logical channel ID (LCID). Similarly, the PSCCH packet counter 495 may be a single packet counter, or may include a plurality of packet of counters that are maintained indexed to identify particular PSCCH processes, such as being indexed by some or all of the 8 bits of SA L1 ID (same as the 8 least significant bits of the L2 destination ID). The PSBCH packet counter 485, in certain examples, may be a single packet counter. In other examples, separate PSCCH packet counter 495 and PSSCH packet counter 480 may be combined into a single counter, and the test system 305-a can measure the joint performance of PSCCH and PSSCH (control and data) using the joint counter. The test system 305-a may additionally, in some examples, use different channel conditions for PSCCH and PSSCH transitions to evaluate the performance of PSCCH and PSSCH individually.

After initiating the UE test loop function 470 the UE 115-d may, upon reception of corresponding packets, increment appropriate ProSe packet counters 475. For example, for received PSDCH communications, upon successful reception of a SL-DCH MAC SDU 430, the UE test loop function 470 may, in some examples, increment the PSDCH packet counter 490 by 1. In examples that use a plurality of counters in the PSDCH packet counter 490, the UE test loop function 470 may use an identification associated with a PDSCH process (e.g., a received 'ProSe App Code') to index into the correct counter within PSDCH packet counter 490 and increment that counter by one. In examples, for received PSSCH communications, upon successful reception of a STCH PDCP SDU, the UE test loop function 470 may increment the PSSCH packet counter 480 by one. In examples that use a plurality of counters in the PSSCH packet counter 480, the UE test loop function 470 also may use an identification associated with a PSSCH process (e.g., all or port of a received triplet of 24 bits of L2 Source ID, 24 bits of L2 destination ID, or 5 bits of LCID) to index into the correct counter within PSSCH packet counter 480 and increment that counter by one.

In some examples, for received PSCCH communications, upon successful reception of a PSCCH 420 transport block the UE test loop function 470 may increment the PSCCH packet counter 495 by one. In examples that use a plurality of counters in the PSCCH packet counter 495, the UE test loop function 470 also may use an identification associated with a PSCCH process (e.g., a received 8 bits of an L1 SAID) to index into the correct counter within PSCCH packet counter 495 and increment that counter by one. In certain examples, for received PSBCH communications, upon successful reception of a SBCH 445 RLC SDU, the UE test loop function 470 may increment the PSBCH packet counter 485 by one.

As noted, test system 305-a may perform conformance testing for the D2D communications channels by closing UE test loop function 470 at UE 115-d. The test system 305-a may open the UE test loop function 470 to deactivate the UE 115-d testing. When testing is complete, the test system 305-a may evaluate test results to determine if UE 115-d has passed the testing. In some examples, the test system 305-a may send a request message to request the UE to report the value associated with the counters 480-495 of the ProSe packet counters 475. In some examples, the request message may also include the ProSe channels for which the counter values are requested. On reception of the request from the test system 305-a, the UE 115-d may respond with the packet counter values for the ProSe packet counters 475 as requested. The UE 115-d may, in some examples where one or more of the counters 480-495 include a plurality of indexed counters, also provide a counter index for each reported counter and a mapping between the counter index and associated identification of the process associated with the counter (e.g., ProSe app code; triplet of L2 Source ID, L2 destination ID, LCID; L1 SA ID). In other examples, the test system 305-a may request the UE 115-d to report the packet counter for specific channel and specific purpose. For example, the test system 305-a may, for PSDCH, request a counter specific to a particular 'ProSe App Code' or to the index to the ProSe App Code. In other examples, the test system 305-a may request, for PSSCH, a counter specific to a triplet (L2 Source ID, L2 destination ID, LCD) or to the index to the triplet. Similarly, the test system 305-a may, for PSCCH, request a counter specific to a particular L1 SA ID or to the index to the L1 SA ID.

Figure 5:
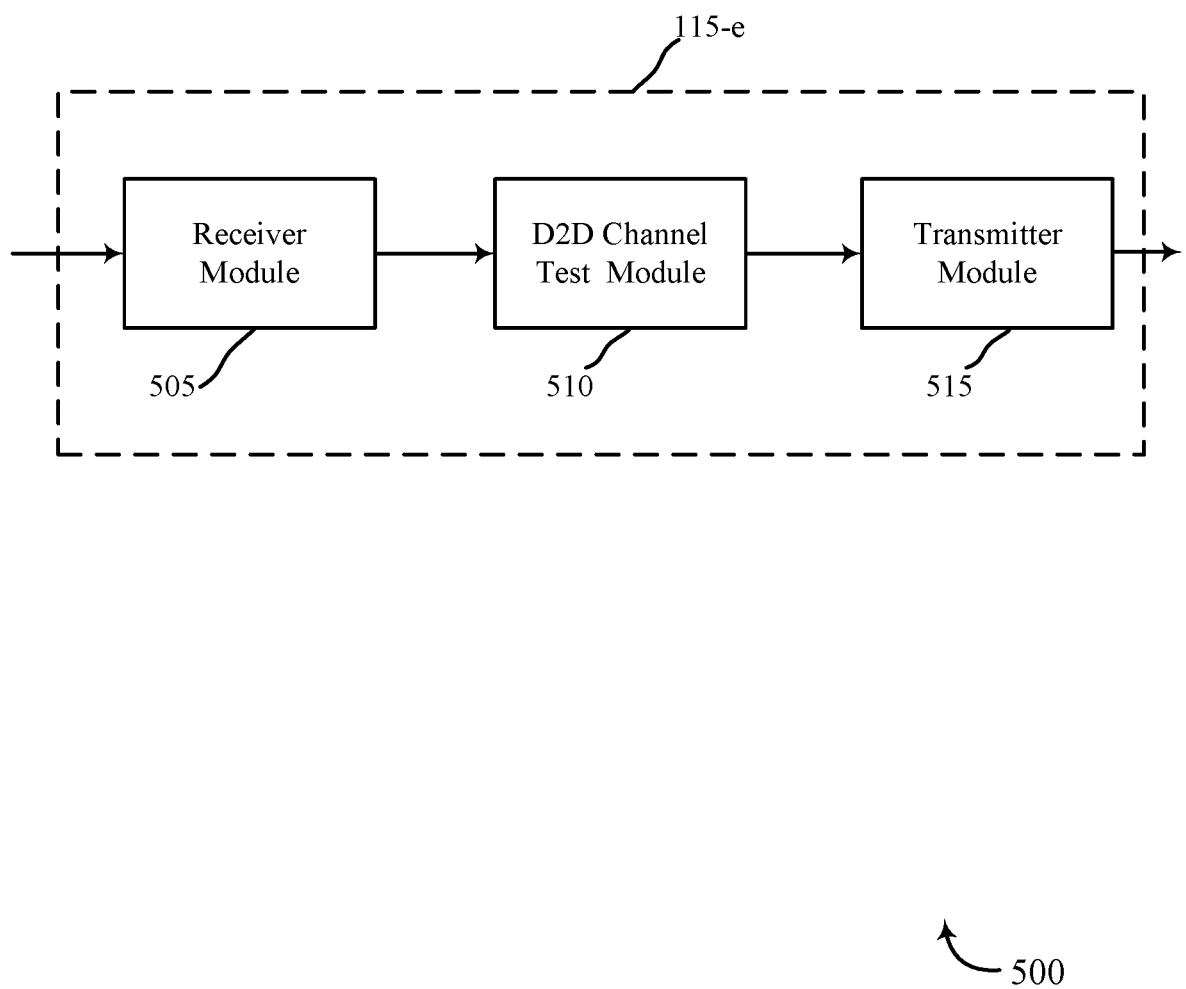
FIG. 5 is a block diagram of a device configured for use in wireless communication, in accordance with various aspects of the present disclosure.

FIG. 5 shows a block diagram 500 of a device 115-e for use in wireless communication, in accordance with various aspects of the present disclosure. The device 115-a may be an example of one or more aspects of a UE 115 described with reference to FIGS. 1-4. The device 115-e may include a receiver module 505, a D2D channel test module 510, and/or a transmitter module 515. The device 115-e may also be or include a processor (not shown). Each of these modules may be in communication with each other.

The components of the device 115-e may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 505 may receive information such as packets, user data, and/or control information associated with various information channels (e.g., control channels, data channels, test system test signals, etc.). The receiver module 505 may receive messages from a test system, including information associated with D2D proximity service communications channels, which may be tested to verify compliance with one or more protocols. The receiver module 505 may also receive signals from a wireless base station, or a different UE via D2D communications that include information or are otherwise associated with proximity service communications, e.g., discovery signals, communications, etc. Information may be passed on to the D2D channel test module 510, and to other components of the device 115-e.

The D2D channel test module 510 may manage D2D proximity service test functions for the device 115-e. The D2D channel test module 510 may identify TBs or SDUs associated with particular D2D channels, and increment one or more counters associated with the identified TBs or SDUs when in closed loop test mode, for example, in a manner as discussed above with respect to FIGS. 1-4.

The transmitter module 515 may transmit the one or more signals received from other components of the device 115-a. The transmitter module 515 may transmit, for example, test information such as counter values and counter indexes, to a test system, as discussed above with respect to FIG. 104. The transmitter module 515 may also handle wireless transmissions of the device 115-a, and may send messages to a serving cell, for example. The transmitter module 515 may also send signals to a different device via D2D communications for proximity service communications. In some examples, the transmitter module 515 may be collocated with the receiver module 505 in a transceiver module.

Figure 6:
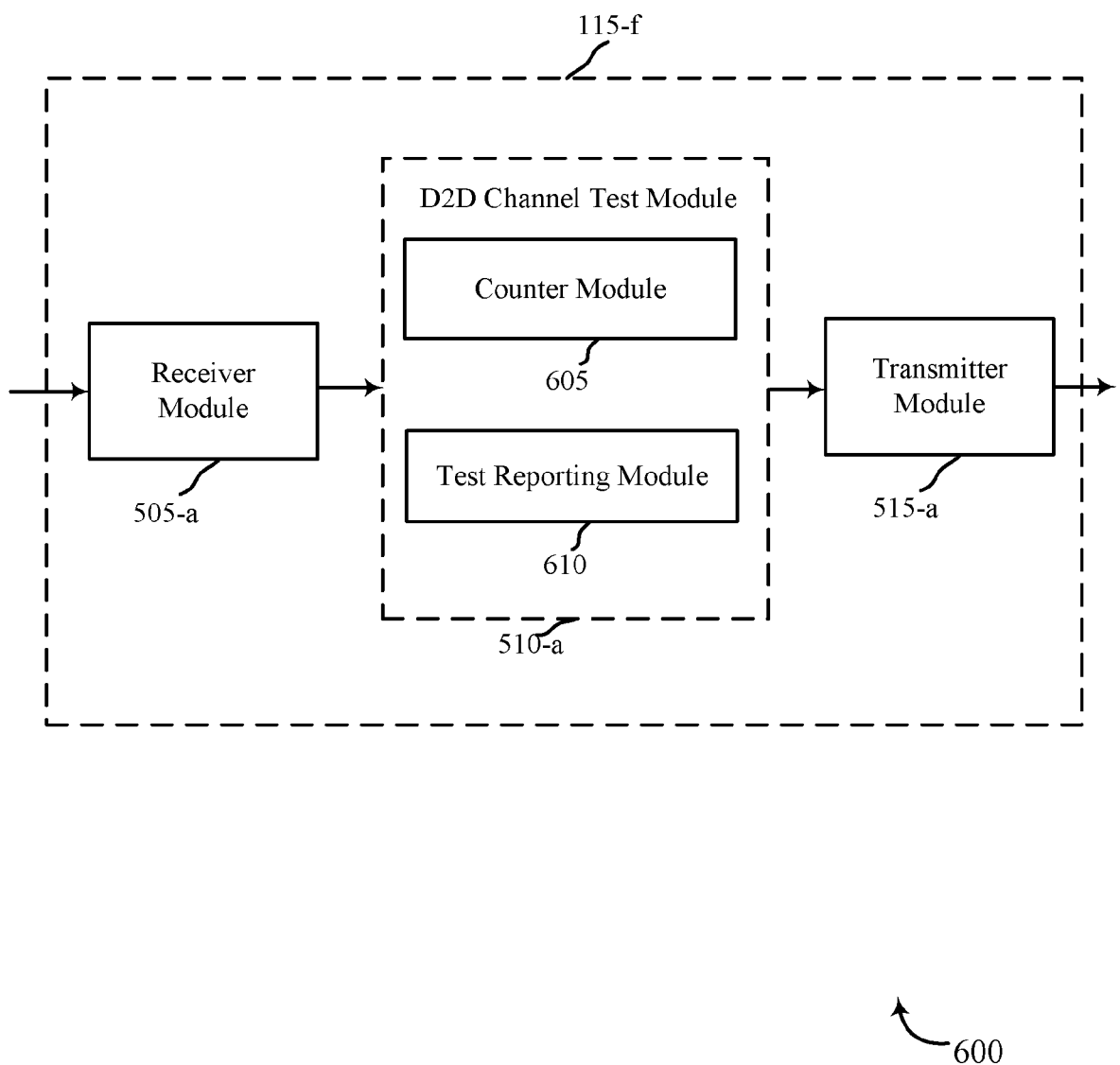
FIG. 6 is a block diagram of another device configured for use in wireless communication, in accordance with various aspects of the present disclosure.

FIG. 6 shows a block diagram 600 of a device 115-f for use in wireless communication, in accordance with various examples. The device 115-f may be an example of one or more aspects of a UE 115 described with reference to FIGS. 1-4. It may also be an example of a device 115-e described with reference to FIG. 5. The device 115-f may include a receiver module 505-a, a D2D channel test module 510-a, and/or a transmitter module 515-a, which may be examples of the corresponding modules of device 115-e. The device 115-f may also include a processor (not shown). Each of these components may be in communication with each other. The D2D channel test module 510-a may include a counter module 605, and a test reporting module 610. The receiver module 505-a and the transmitter module 515-a may perform the functions of the receiver module 505 and the transmitter module 515, of FIG. 5, respectively.

The components of the device 115-f may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The counter module 605 may manage aspects of counting TBs or SDUs associated with different proximity service channels, in a manner similarly as discussed above with respect to FIGS. 1-4. The test reporting module 610 may manage aspects of responding to test system requests for values foo en or more different counters of the counter module 605, in a manner similarly as discussed above with respect to FIGS. 1-4. For example, the test reporting module 610 may, in cooperation with the counter module 605, provide counter information related to a particular D2D channel accumulated during a closed loop test routine.

Figure 7:
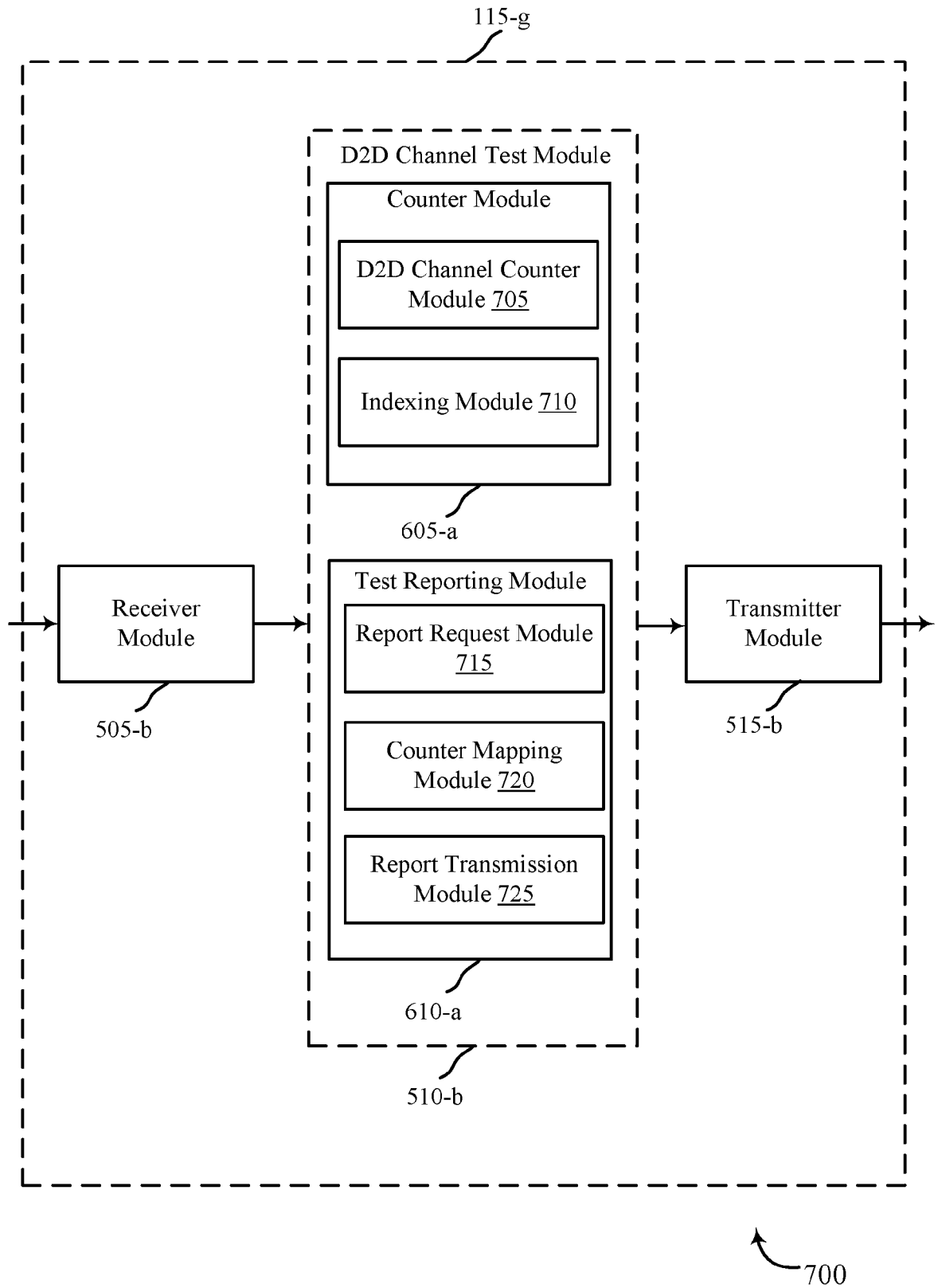
FIG. 7 is a block diagram of another device configured for use in wireless communication, in accordance with various aspects of the present disclosure.

FIG. 7 shows a block diagram 700 of a device 115-g for use in wireless communication, in accordance with various examples. The device 115-g may be an example of one or more aspects of UEs 115 described with reference to FIGS. 1-4. It may also be an example of a device 115-e and/or 115-f described with reference to FIG. 5 or 6. The device 115-g may include a receiver module 505-b, a D2D channel test module 510-b, and/or a transmitter module 515-b, which may be examples of the corresponding modules of devices 115-e and/or 115-f. The device 115-g may also include a processor (not shown). Each of these components may be in communication with each other. The D2D channel test module 510-b may include a counter module 605-a, and a test reporting module 610-a. The receiver module 505-b and the transmitter module 515-b may perform the functions of the receiver module 505 and the transmitter module 515, of FIG. 5 or 6, respectively.

The components of the device 115-g may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-custom ICs), which may be programmed in any manner known in the art. The functions of each module may also be implemented, in whole or in part, with instructions embodied in a memory, formatted to be executed by one or more general or application-specific processors.

The counter module 605-a may include a D2D channel counter module 705 and an indexing module 710 and may manage aspects of maintaining counters associated with D2D channels and related indexes to identify particular processes of a channel being tested, similarly as discussed above with respect to FIGS. 2-4. The indexing module 710 may maintain an index of a particular counter for a channel with one or more process identifications of the channel, as discussed above with respect to FIGS. 2-4.

The test reporting module 610-a may include a report request module 715, a counter mapping module 720, and a report transmission module 725 and may manage aspects of receiving requests to report counter information, identifying a mapping between a counter and a D2D channel process associated with the counter, and reporting counter information responsive to received requests The report request module 715 may, for example, receive requests from a test system to provide a value for one or more counters of the counter module 605-a, in a manner as discussed above with respect to FIGS. 2-4. The counter mapping module may identify a mapping between a counter and a D2D channel process associated with the counter, in cases where a counter for a particular D2D channel has an associated plurality of counters, as discussed above with respect to FIGS. 2-4. The report transmission module 725 may transmit requested reports to the test system, in a manner is discussed above with respect to FIGS. 2-4.

Figure 8:
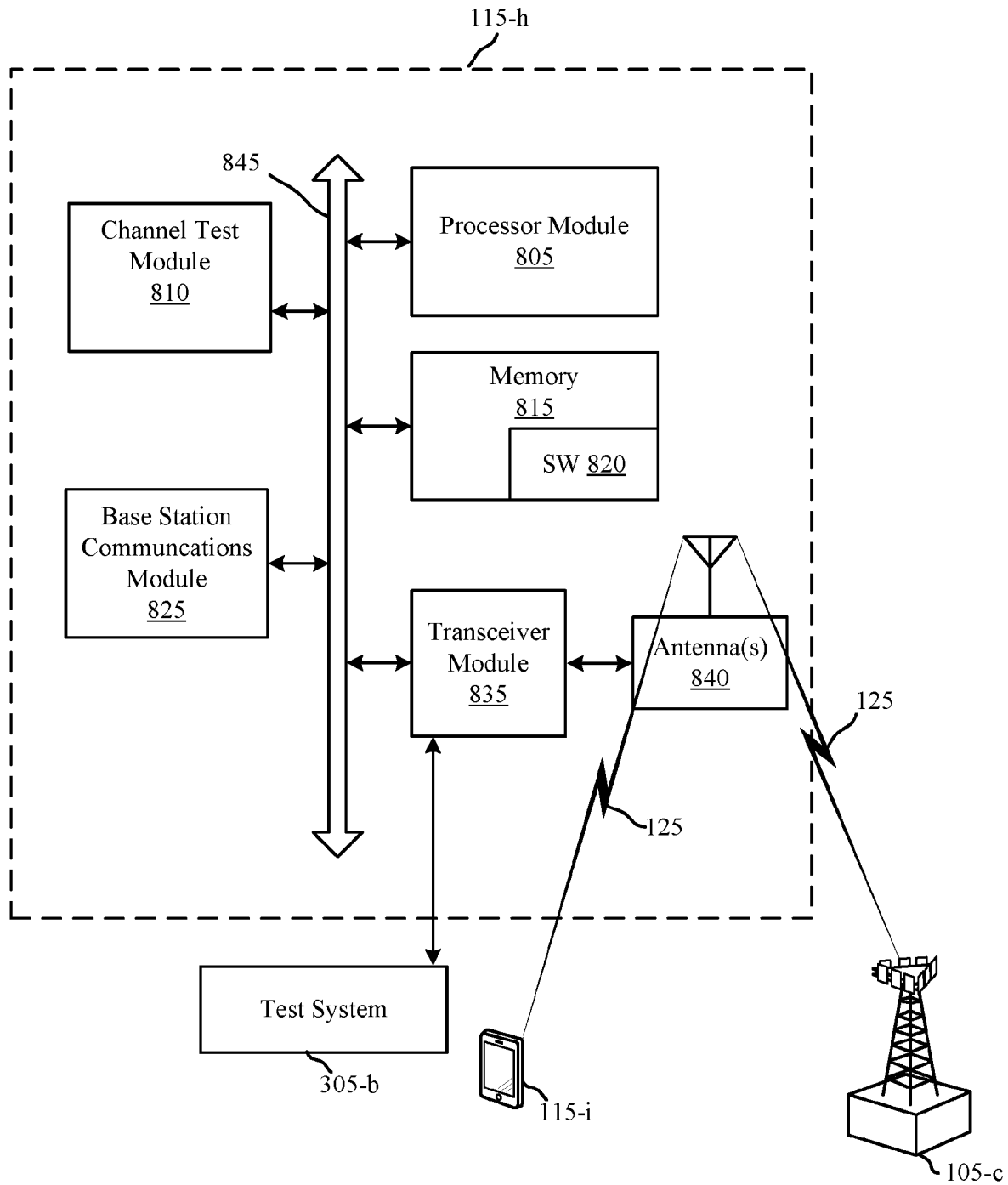
FIG. 8 is a block diagram of a wireless communication system, in accordance with various aspects of the present disclosure.

FIG. 8 shows a system 800 for use in wireless communication, in accordance with various examples. System 800 may include a UE 115-h, which may be an example of the UEs 115 of FIGS. 1-4. UE 115-h may also be an example of one or more aspects of devices 115 of FIGS. 5, 6, and/or 7.

The UE 115-h may generally include components for bi-directional voice and data communications including components for transmitting communications and components for receiving communications. The UE 115-h may include antenna(s) 840, a transceiver module 835, a processor module 805, and memory 815 (including software (SW)

820), which each may communicate, directly or indirectly, with each other (e.g., via one or more buses 845). The transceiver module 835 may communicate bi-directionally, via the antenna(s) 840 and/or one or more wired or wireless links 125, with one or more networks or a test system 305-*b*, as described above. For example, the transceiver module 835 may communicate bi-directionally with base stations 105-*c*, with other UEs 115-*i*, and/or with test systems 305 of FIG. 3 or 4. The transceiver module 835 may include a modem to modulate the packets and provide the modulated packets to the antenna(s) 840 for transmission, and to demodulate packets received from the antenna(s) 840. While the UE 115-*h* may include a single antenna 840, the UE 115-*h* may have multiple antennas 840 capable of concurrently transmitting and/or receiving multiple wireless transmissions via carrier aggregation techniques, for example. The transceiver module 835 may be capable of concurrently communicating with one or more base stations 105 via multiple component carriers. The UE 115-*h* may include a channel test module 810, which may perform the functions described above for the D2D channel test module 510 of devices 115 of FIG. 5, 6, or 7.

The memory 815 may include random access memory (RAM) and read-only memory (ROM). The memory 815 may store computer-readable, computer-executable software/firmware code 820 containing instructions that, when executed, cause the processor module 805 to perform various functions described herein (e.g., identify TBs or SDUs of D2D channels, increment counters, report counter values when requested, etc.). Alternatively, the computer-readable, computer-executable software/firmware code 820 may not be directly executable by the processor module 805 but cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
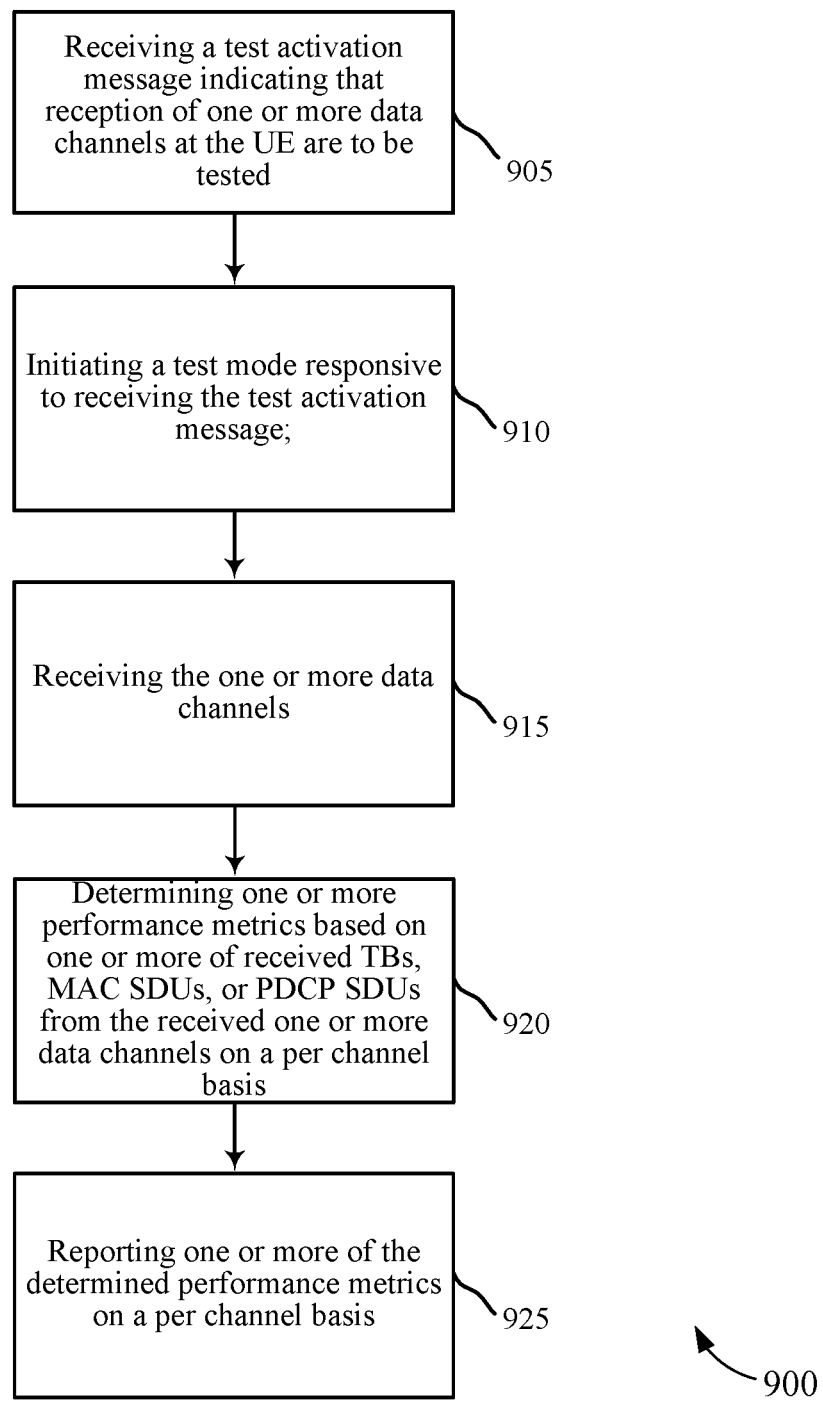
FIG. 9 is a flow chart illustrating an example of a method for testing a UE, in accordance with various aspects of the present disclosure.

FIG. 9 is a flow chart illustrating an example of a method 900 for performance testing of a wireless communications UE, in accordance with various aspects of the present disclosure. For clarity, the method 900 is described below with reference to aspects of one or more of the UEs described with reference to FIG. 1, 2, 3, 4, or 8 and/or aspects of one or more of the devices described with reference to FIG. 5, 6, or 7. In some examples, a UE may execute one or more sets of codes to control the functional elements of the UE to perform the functions described below. Additionally or alternatively, the UE may perform one or more of the functions described below using special-purpose hardware.

At block 905, the method 900 may include receiving a test activation message indicating that reception of one or more data channels at the UE are to be tested, as described above. The operations at block 905 may be performed using, for example, the L3 test control 465 of FIG. 4, the D2D channel test module 510 of FIGS. 5-7, or the channel test module 810 of FIG. 8.

At block 910, the method 900 may include initiating a test mode responsive to receiving the test activation message, as described above. The operations at block 910 may be performed using, for example, the L3 test control 465 and UE test loop function 470 of FIG. 4, the D2D channel test module 510 of FIGS. 5-7, or the channel test module 810 of FIG. 8.

At block 915, the method 900 may include receiving the one or more data channels, as described above. The operations at block 915 may be performed using, for example, the L1 physical layer 405 of FIG. 4, the receiver 505 of FIGS. 5-7, or the transceiver module 835 and/or antennas 840 of FIG. 8.

At block 920, the method 900 may include determining one or more performance metrics based on one or more of received TBs, MAC SDUs, or PDCP SDUs from the received one or more data channels on a per channel basis, as described above. The operations at block 920 may be performed using, for example, the UE test loop function 470 of FIG. 4, the D2D channel test module 510 of FIGS. 5-7, or the channel test module 810 of FIG. 8.

At block 925, the method 900 may include reporting one or more of the determined performance metrics on a per channel basis, as described above. The operations at block 925 may be performed using, for example, the L3 test control layer 465, the UE test loop function 470, and/or the L1 physical layer 405 of FIG. 4, the D2D channel test module 510 and transmitter module 515 of FIGS. 5-7, the test reporting module 610 of FIGS. 6-7, or channel test module 810, the transceiver module 835 and/or antennas 840 of FIG. 8.

Thus, the method 900 may provide for wireless communication. It should be noted that the method 900 is just one implementation and that the operations of the method 900 may be rearranged or otherwise modified such that other implementations are possible.

Figure 10:
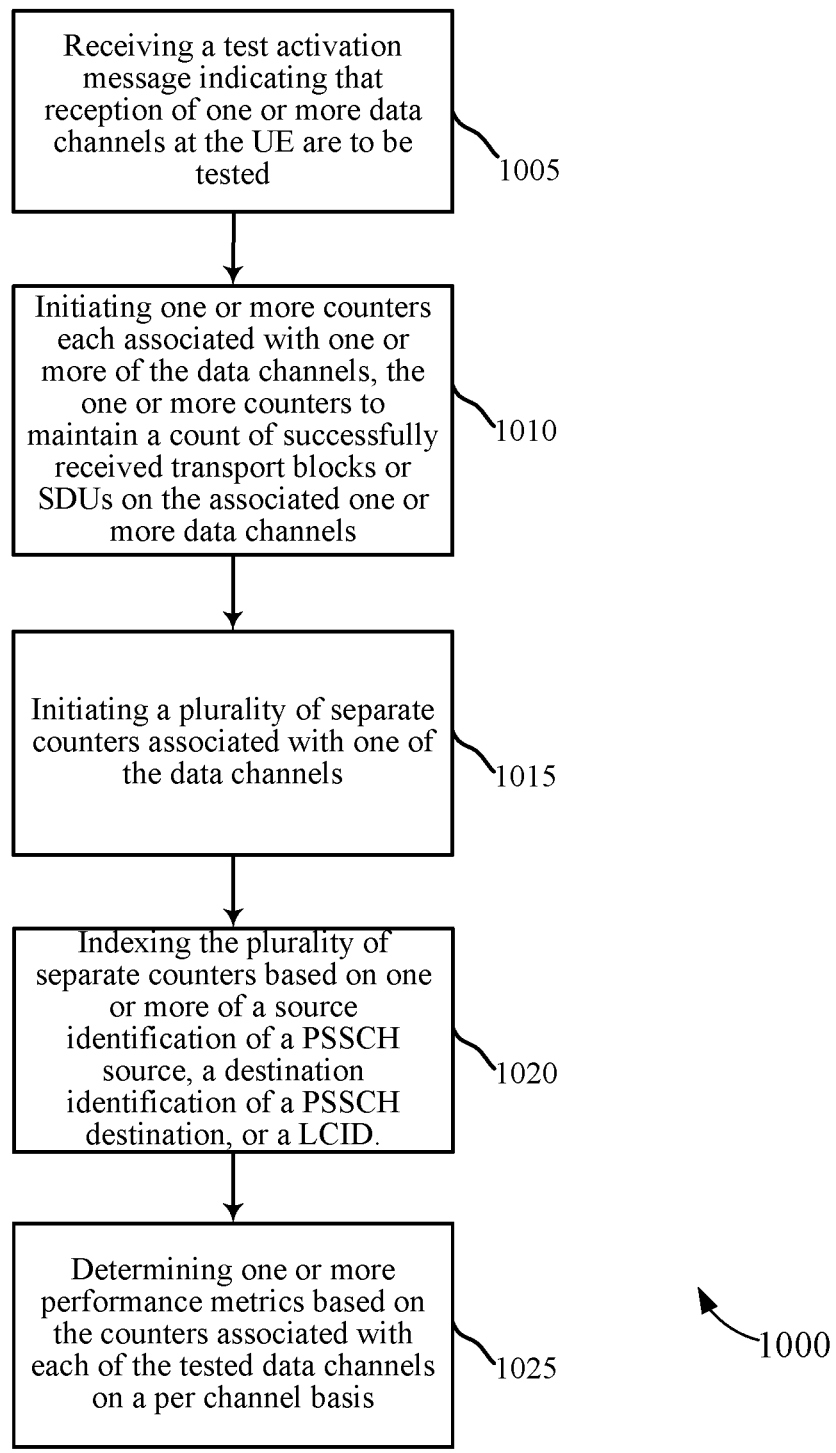
FIG. 10 is a flow chart illustrating an example of a method for testing a UE, in accordance with various aspects of the present disclosure.

FIG. 10 is a flow chart illustrating an example of a method 1000 for performance testing of a wireless communications UE, in accordance with various aspects of the present disclosure. For clarity, the method 1000 is described below with reference to aspects of one or more of the UEs described with reference to FIG. 1, 2, 3, 4, or 8 and/or aspects of one or more of the devices described with reference to FIG. 5, 6, or 7. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include receiving a test activation message indicating that reception of one or more data channels at the UE are to be tested, as described above. The operations at block 1005 may be performed using, for example, the L3 test control 465 of FIG. 4, the D2D channel test module 510 of FIGS. 5-7, or the channel test module 810 of FIG. 8.

At block 1010, the method 1000 may include initiating one or more counters each associated with one or more of the data channels, the one or more counters to maintain a count of successfully received transport blocks or SDUs on the associated one or more data channels, as described above. The operations at block 1010 may be performed using, for example, the UE test loop function 470 of FIG. 4, the D2D channel test module 510 of FIGS. 5-7, the counter module 605 of FIGS. 6-7, or the channel test module 810 of FIG. 8.

At block 1015, the method 1000 may include initiating a plurality of separate counters associated with one of the data channels, as described above. The operations at block 1015 may be performed using, for example, the UE test loop function 470 of FIG. 4, the D2D channel test module 510 of FIGS. 5-7, the counter module 605 of FIGS. 6-7, or the channel test module 810 of FIG. 8.

At block 1020, the method 1000 may include indexing the plurality of separate counters based on one or more of a source identification of a PSSCH source, a destination identification of a PSSCH destination, or a LCID, as described above. The operations at block 1020 may be performed using, for example, the UE test loop function 470 of FIG. 4, the D2D channel test module 510 of FIGS. 5-7, the counter module 605 of FIGS. 6-7, the indexing module 710 of FIG. 7, or the channel test module 810 of FIG. 8.

At block 1025, the method 1000 may include determining one or more performance metrics based on the counters associated with each of the tested data channels on a per channel basis, as described above. The operations at block 1025 may be performed using, for example, the UE test loop function 470 of FIG. 4, the D2D channel test module 510 of FIGS. 5-7, or the channel test module 810 of FIG. 8.

Thus, the method 1000 may provide for wireless communication. It should be noted that the method 1000 is just one implementation and that the operations of the method 1000 may be rearranged or otherwise modified such that other implementations are possible.

Thus, methods 900 and 1000 may provide for coverage enhancement in a wireless system. It should be noted that methods 900 and 1000 describe possible implementation, and that the operations and the steps may be rearranged or otherwise modified such that other implementations are possible. In some examples, aspects from two or more of the methods 900 and 1000 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques.

These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for performance testing a wireless communications user equipment (UE) device, comprising:
   receiving a test activation message indicating that reception of two or more data channels at the UE are to be tested;
   initiating, responsive to receiving the test activation message, a first plurality of counters associated with a first data channel of the two or more data channels, each counter of the first plurality of counters indexed by a process identification;
   receiving the two or more data channels;
   determining one or more performance metrics based on one or more of received transport blocks (TBs) or received service data units (SDUs) from the received two or more data channels on a per channel basis; and
   reporting one or more of the determined performance metrics on a per channel basis.

2. The method of claim 1, wherein the received SDUs comprise one or more of medium access control (MAC) SDUs, radio link control (RLC) SDUs, or packet data convergence protocol (PDCP) SDUs.

3. The method of claim 2, wherein the test activation message is a device-to-device (D2D) test activation message to initiate the test mode for two or more D2D channels.

4. The method of claim 3, wherein the two or more D2D channels comprise one or more of a Physical Sidelink Discovery Channel (PSDCH), a Physical Sidelink Shared Channel (PSSCH), a Physical Sidelink Control Channel (PSCCH), or a Physical Sidelink Broadcast Channel (PSBCH).

5. The method of claim 3, wherein the two or more D2D channels comprise at least a first data channel associated with discovery of D2D devices and at least a second data channel associated with communications with D2D devices.

6. The method of claim 1, wherein the test activation message is received from a test system coupled with the UE.

7. The method of claim 1, wherein:
   the first plurality of counters maintain a count of successfully received transport blocks or SDUs on the first data channel.

8. The method of claim 1, further comprising:
   initiating, responsive to receiving the test activation message, one or more second counters associated with a second data channel of the two or more data channels.

9. The method of claim 1, wherein a number of the first plurality of counters corresponds to a maximum number of simultaneous discovery processes supported by the UE.

10. The method of claim 9, wherein the first plurality of counters are indexed by a code associated with each simultaneous discovery process.

11. The method of claim 1, wherein a number of the first plurality of counters corresponds to a maximum number of simultaneous Physical Sidelink Control Channel (PSCCH) processes supported by the UE.

12. The method of claim 11, wherein the first plurality of counters are indexed by an identification of a logical group of D2D devices.

13. The method of claim 1, wherein a number of the first plurality of counters corresponds to a maximum number of simultaneous Physical Sidelink Shared Channel (PSSCH) processes supported by the UE.

14. The method of claim 13, wherein the first plurality of counters are indexed by one or more of a source identification of a PSSCH source, a destination identification of a PSSCH destination, or a logical channel identification (LCID).

15. The method of claim 8, wherein the one or more second counters are associated with a Physical Sidelink Broadcast Channel (PSBCH).

16. The method of claim 1, wherein the determining one or more performance metrics comprises:
   incrementing a counter of the first plurality of counters associated with each respective process for each successfully received transport block or SDU associated with the respective process on the first data channel.

17. The method of claim 1, wherein reporting one or more of the performance metrics comprises:
   receiving a request to report counter information for a requested counter of the first plurality of counters; and
   transmitting a report of counter information responsive to receiving the request to report, wherein the report of the counter information comprises information for each of the first plurality of counters associated with the requested counter and a mapping between counters of the first plurality of counters and the process identifications.

18. An apparatus for performance testing wireless communications, comprising:
   means for receiving a test activation message indicating that reception of two or more data channels at the apparatus are to be tested;
   means for initiating, responsive to receiving the test activation message, a first plurality of counters associated with a first data channel of the two or more data channels, each counter of the first plurality of counters indexed by a process identification;
   means for receiving the two or more data channels;
   means for determining one or more performance metrics based on one or more of received transport blocks (TBs) or received service data units (SDUs) from the received two or more data channels on a per channel basis; and
   means for reporting one or more of the determined performance metrics on a per channel basis.

19. The apparatus of claim 18, wherein the first plurality of counters maintain a count of successfully received transport blocks or SDUs on the first data channel.

20. The apparatus of claim 19, wherein the means for initiating the test mode initiates, responsive to receiving the test activation message, one or more second counters associated with a second data channel of the two or more data channels.

21. The apparatus of claim 19, wherein the means for determining one or more performance metrics increments a counter of the first plurality of counters associated with each respective process for each successfully received transport block or SDU associated with the respective process on the first data channel.

22. The apparatus of claim 19, wherein the means for reporting one or more of the performance metrics:

receives a request to report counter information for a requested counter of the first plurality of counters; and transmits a report of counter information responsive to receiving the request to report.

23. An apparatus for performance testing a wireless communications user equipment (UE) device, comprising:

a processor;

memory in electronic communication with the processor; and instructions stored in the memory, wherein the instructions are executable by the processor to:

receive a test activation message indicating that reception of two or more data channels at the apparatus are to be tested;

initiate, responsive to receiving the test activation message, a first plurality of counters associated with a first data channel of the two or more data channels, each counter of the first plurality of counters indexed by a process identification;

receive the two or more data channels;

determine one or more performance metrics based on one or more of received transport blocks (TBs) or received service data units (SDUs) from the received two or more data channels on a per channel basis; and report one or more of the determined performance metrics on a per channel basis.

24. The apparatus of claim 23, wherein the received SDUs comprise one or more of medium access control (MAC) SDUs, radio link control (RLC) SDUs, or packet data convergence protocol (PDCP) SDUs.

25. The apparatus of claim 24, wherein the test activation message is a device-to-device (D2D) test activation message to initiate the test mode for two or more D2D channels.

26. The apparatus of claim 25, wherein the two or more D2D channels comprise one or more of a Physical Sidelink Discovery Channel (PSDCH), a Physical Sidelink Shared Channel (PSSCH), a Physical Sidelink Control Channel (PSCCH), or a Physical Sidelink Broadcast Channel (PSBCH).

27. The apparatus of claim 25, wherein the two or more D2D channels comprise at least a first data channel associated with discovery of D2D devices and at least a second data channel associated with communications with D2D devices.

28. A non-transitory computer-readable medium storing code for performance testing a wireless communications user equipment (UE) device, the code comprising instructions executable by a processor to:

receive a test activation message indicating that reception of two or more data channels at the UE are to be tested;

initiate, responsive to receiving the test activation message, a first plurality of counters associated with a first data channel of the two or more data channels, each counter of the first plurality of counters indexed by a process identification;

receive the two or more data channels;

determine one or more performance metrics based on one or more of received transport blocks (TBs) or received service data units (SDUs) from the received two or more data channels on a per channel basis; and report one or more of the determined performance metrics on a per channel basis.

29. The apparatus of claim 18, wherein a number of the first plurality of counters corresponds to a maximum number of simultaneous discovery processes supported by the apparatus.

30. The apparatus of claim 18, wherein a number of the first plurality of counters corresponds to a maximum number of simultaneous Physical Sidelink Control Channel (PSCCH) processes supported by the apparatus.

* * * * *